United States Patent [19]
Gabriel

[11] 3,752,124
[45] Aug. 14, 1973

[54] WATERING BOTTLE ASSEMBLY FOR ANIMALS

[75] Inventor: George S. Gabriel, Mahwah, N.J.

[73] Assignee: Lab Products, Inc., Garfield, N.J.

[22] Filed: Sept. 28, 1971

[21] Appl. No.: 184,442

[52] U.S. Cl. .................................. 119/72.5, 119/72
[51] Int. Cl. ............................................ A01k 07/00
[58] Field of Search .................... 119/18, 72, 72.5, 119/51.5, 75

[56] References Cited
UNITED STATES PATENTS

| | | | |
|---|---|---|---|
| 3,251,342 | 5/1966 | Kay .................................. | 119/72.5 X |
| 3,228,377 | 1/1966 | Grassano .......................... | 119/72.5 |
| 3,367,308 | 2/1968 | Quattrone et al. ................ | 119/18 X |
| 3,334,614 | 8/1967 | Gass et al. ........................ | 119/18 |
| 3,492,970 | 2/1970 | Keen et al. ....................... | 119/18 |
| 3,529,575 | 9/1970 | Schalk .............................. | 119/72.5 |
| 3,537,428 | 11/1970 | Montgomery ..................... | 119/18 |
| 3,645,234 | 2/1972 | Schroer ............................ | 119/18 |

*Primary Examiner*—Russell R. Kinsey
*Assistant Examiner*—James H. Czerwonky
*Attorney*—Edward F. Levy

[57] ABSTRACT

A watering bottle assembly for caged laboratory animals includes a completely hollow cylindrical tube of transparent plastic material mounted at one end in the stopper of a water bottle. In the free end of the tube a one-piece metal tip is frictionally mounted, the tip having an enlarged semi-spherical head portion projecting from the plastic tube and having a water outlet aperture accessible to the caged animals for drinking. The outer diameter of the tube is substantially equal to the outer diameter of at least a portion of the enlarged head portion of the metal tip.

7 Claims, 4 Drawing Figures

PATENTED AUG 14 1973

3,752,124

Inventor:
George S. Gabriel

By: Edward F. Levy
Attorney:

WATERING BOTTLE ASSEMBLY FOR ANIMALS

The present invention relates to novel and improved watering tube for laboratory animals.

Small laboratory animals such as mice, rats, guinea pigs and the like are normally kept in a cage or receptacle lined with animal bedding material. In order to maintain the health and well-being of the animals it is necessary to provide a supply of drinking water for the animals as needed. The drinking water is normally supplied in a bottle which is mounted in inverted position on the roof of the cage and has a watering tube or sipper tube extending into the interior of the cage to a position in which it is accessible to the animals therewithin.

The aforementioned watering tubes were originally made from glass tubing so that they had the advantage of being clear and transparent so that cleanliness of the tube could be easily monitored. A dirty or contaminated tube could therefore be removed and replaced. However, such glass tubes had the serious disadvantage of being readily breakable. The animals would constantly chew upon the end of the tube while drinking, causing the glass to break and result in lacerations and bodily harm to the animals.

As a result, watering tubes made of stainless steel were substituted for those made of glass. Such stainless tubes would not break when chewed or gnawed upon by the animals, but presented the disadvantage of not being able to be visually checked for cleanliness, so that contamination therein frequently resulted in diseases in the animals.

An object of the present invention is the provision of a novel and improved watering tube for laboratory animals which provides both the advantages of being nonbreakable and being transparent for visual monitoring of the tube for cleanliness.

Another object of the invention is the provision of a watering tube of the character described which is made in two parts of separate materials, the tip being made of an unbreakable metal, and the remainder being made of a clear transparent material.

A further object of the invention is the provision of a watering tube of the character described which is efficient in use and which may be economically manufactured.

In accordance with the invention herein, there is provided a watering tube comprising an elongated tubular body of rigid transparent material having an inner end adapted to be mounted in the mouth of a liquid container. A metal tip member is mounted in the opposite, outer end of the tubular body and has an enlarged end portion, which is preferably semi-spherical, projecting from said tubular body. The metal tip has a liquid outlet aperture in its enlarged end portion and a through bore which communicates with the outlet aperture and with the interior of said tubular body to supply liquid from said container to said aperture.

Additional objects and advantages of the invention will become apparent during the course of the following specification when taken in connection with the accompanying drawings, in which.

Figure 1:
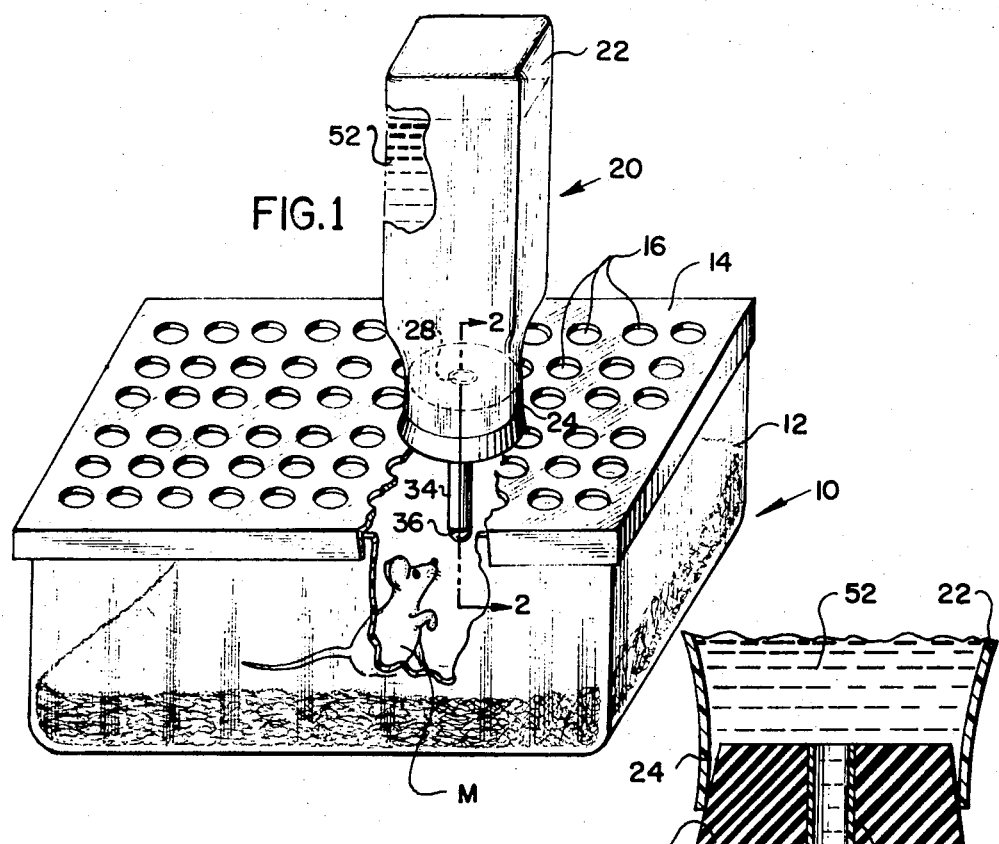
FIG. 1 is a perspective view of a cage for laboratory animals with a watering bottle mounted thereon, and having a watering tube made in accordance with the present invention, portions of the cage being broken away to disclose the watering tube.

Referring in detail to the drawings, there is shown in FIG. 1 a cage or receptacle 10 of conventional type used to house laboratory animals. The cage 10 illustrated herein comprises a boxlike body 12 made of transparent material such as glass or plastic, and having removably mounted thereon a metal lid or roof 14 provided with perforations 16. The cage 10 is made of sufficient size to house one or more laboratory animals such as mice, rats, guinea pigs or the like. In the illustrated form shown in FIG. 1, the cage 10 is made of small size to contain small laboratory animals such as the mouse M shown therein, as well as a layer of animal bedding material.

Figure 2:
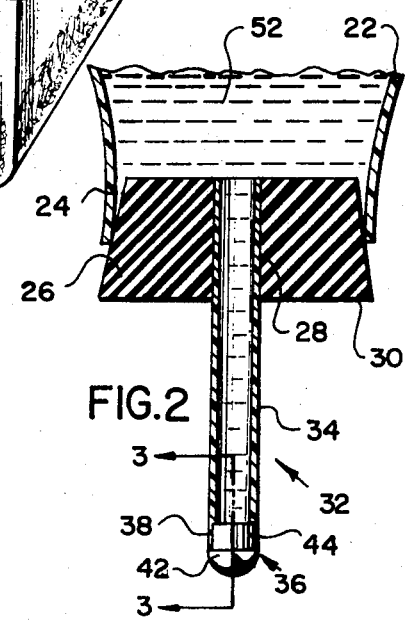
FIG. 2 is an enlarged section taken along line 2—2 of FIG. 1 and showing the mouth of the bottle with the watering tube mounted therein.

The watering bottle 20 shown in FIG. 1 comprises a bottle body 22 made of transparent material, and having a relatively large mouth 24. Within the mouth 24 is inserted the usual rubber stopper 26 having a central through bore 28 and a flat upper surface 30, as best seen in FIG. 2. The bottle body 22 is preferably made of transparent plastic with sufficiently thin walls to permit a slight compressibility of the walls.

The structure heretofore described is conventional and well known, the invention herein residing in the watering or sipper tube 32 which is inserted within the rubber stopper 26 to serve as part of the watering bottle assembly. The sipper tube 32 generally comprises a tube body 34 and a separate tip 36.

The tube body 34 comprises a length of clear, transparent cylindrical tubing preferably made of a rigid plastic such as polycarbonate which is capable of withstanding the heat of autoclaving. The tube body 34 has a uniform external diameter throughout its length, the diameter being such that one end portion of the tube body may be snugly received within the bore 28 of the rubber stopper 26, as shown in FIG. 2, effecting a watertight seal therewith. The opposite, free end of the tube body 34 has a short terminal portion 38, the inner diameter of which is greater than the inner diameter of the remainder of the tube body 34, forming therewith a shoulder 40.

The tip 36 is an integral unit formed of a suitable metal such as stainless steel with an enlarged semispherical head portion 42 and a cylindrical rear portion 44. The rear portion 44 has an external diameter slightly larger than the internal diameter of the tube terminal portion 38 so that it may be press fit and frictionally retained in said terminal portion in the manner shown in FIG. 3. The head portion 42 has a maximum outer diameter substantially equal to the outer diameter of the tube body 34 so that in inserted position its external surface constitutes a smooth continuation of the external surface of the tube terminal portion 38 presenting no breaks or sharp surfaces which could injure the animals while drinking.

Figure 3:
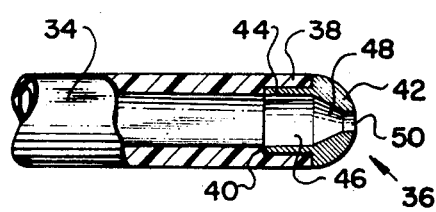
FIG. 3 is an enlarged section taken along line 3—3 of FIG. 2.

It will be observed that the length of the cylindrical rear portion 44 of tip 36 is equal to the length of the terminal portion 38 of the tube body 34 so that when the tip is fully inserted into the tube body, the tip rear portion 44 engages shoulder 40, as shown in FIG. 3, to prevent further insertion, and the flat rear surface of head portion 42 also engages the front end surface of the tube terminal portion 38.

As shown in FIG. 3, the cylindrical rear portion 44 of tip 36 is provided with a longitudinal bore 46 which communicates with a tapered bore 48 in the head portion 42, The tapered bore 48 in turn communicates with a small circular aperture 50 in the front central surface of the said head portion.

In use, the watering bottle 20 is filled with a supply of water 52 or other liquid and is mounted in inverted position on the cage 10. In the type of cage illustrated herein, the bottle is maintained in inverted position by the flat outer surface 30 of the rubber stopper 26 which rests flush upon the upper surface of the cage lid 14, as shown in FIG. 1, with the watering tube 32 extending through one of the perforations 16 into the interior of the cage body 12 for a sufficient distance to permit the housed animals to reach the tip of the tube.

When the filled bottle 20 is mounted in inverted position, the contained water 52 feeds by gravity through sipper tube 34 and the tip bores 46 and 48 to the aperture 50. The diameter of aperture 50 is sufficiently small that water will not freely drip therethrough, but will readily form a drop at the aperture 50 which may be removed by licking or touching of an animal within the cage 10. The removed drop will then be replaced by a further drop which can then be removed by further licking or touching by the animals.

In other types of conventional animal cages, the lid is not perforated, but consists of parallel bars and is formed with angular depressions in which the bottle is mounted in a downwardly-inclined position. The feed of the bottle content is, however, essentially the same.

Because the tube tip 36 is made of stainless steel, it will withstand any chewing by the laboratory animals without danger of breaking and harming the animals. On the other hand, since the main tube body 34 is transparent, it can be constantly visually monitored for cleanliness. Further, the plastic material from which the tube body is made permits the tube to be forcibly inserted through the bore of the rubber stopper without danger of shattering and cutting the hands of the user.

Figure 4:
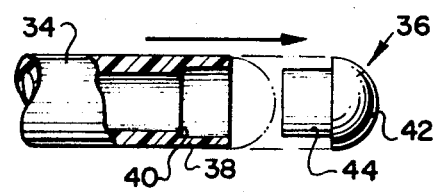
FIG. 4 is an enlarged section of the end of the watering tube, similar to FIG. 3 but showing the metal tip disassembled from the tube.

Once the tip 36 is inserted within the terminal portion 38 of tube body 34, it cannot be removed by the laboratory animals because of the smooth rounded surface of the exposed tip head as well as the frictional resistance provided by the press fit between these parts. The tip may, however, be forcibly extracted by the laboratory attendant for cleaning and sterilizing, in the manner indicated in FIG. 4.

While the tip 36, as previously described, has been made with a with a rear portion 44 of reduced diameter which fits within the end of the plastic tube body 34, it will be appreciated that alternatively the tip 36 may be made in such a manner that it telescopes over the end of the transparent plastic tube body 34 rather than within it. Thus, the rear portion 44 may be made of a diameter slightly larger than the plastic tube body 34 so that the end of the latter fits within it with a press fit, or may be secured by cementing. In this instance, the head portion 42 which projects forwardly of the plastic tube body would still be made of a diameter which is substantially equal to the outer diameter of the tube body 34, and would still preferably be made of semispherical shape as shown.

While a preferred embodiment of the invention has been shown and described herein, it is obvious that numerous omissions, changes and additions may be made in such embodiment without departing from the spirit and scope of the invention.

I claim:

1. A watering bottle assembly for animals comprising a bottle, a flexible stopper closing the mouth of said bottle and having a through bore therein, a sipper tube comprising an elongated completely hollow tubular body of rigid transparent plastic material having an inner end sized to be frictionally retained within the bore of said stopper, and an opposite outer end, and a small, one-piece metal tip member having one end portion frictionally mounted on the outer end of said transparent tubular body and having its other, enlarged end portion projecting therefrom, the outer diameter of said tubular body being substantially equal to the outer diameter of at least a portion of the enlarged end portion of the tip member, said tip member having a solid metal body formed with a liquid outlet aperture in its enlarged end portion and a through bore communicating with said outlet aperture and with the interior of said tubular body.

2. A watering tube according to claim 1 in which said tubular body is made of a transparent plastic capable of withstanding autoclaving temperatures.

3. A watering tube according to claim 1 in which said metal tip member is made of stainless steel.

4. A watering tube according to claim 1 in which said metal tip member has a rear portion of reduced diameter inserted within the outer and of said tubular body, and an enlarged forward end portion which projects from said tubular body.

5. A watering tube according to claim 4 in which the enlarged forward end portion of said metal tip is semispherical and in which the rear end portion said metal tip is of cylindrical shape.

6. A watering tube according to claim 5 in which said transparent tubular body has an outer end portion of enlarged inner diameter and in which the cylindrical end portion of said tip member has an outer diameter slightly greater than said enlarged inner diameter of said end portion, whereby said tip member is press fitted and frictionally retained within said tubular body.

7. A watering tube according to claim 6 in which the diameter of said semi-spherical end portion of said tip member is substantially equal to the outer diameter of said tubular body.

* * * * *